United States Patent Office

Re. 26,466
Reissued Sept. 24, 1968

26,466

OIL PRODUCTION METHOD UTILIZING IN SITU CHEMICAL HEATING OF HYDROCARBONS

Philip J. Closmann and Michael Prats, Houston, Tex., assignors to Shell Oil Company, New York, N.Y., a corporation of Delaware No Drawing. Original No. 3,250,328, dated May 10, 1966, Ser. No. 324,843, Nov. 19, 1963. Application for reissue Feb. 20, 1967, Ser. No. 626,641
8 Claims. (Cl. 166—11)

Matter enclosed in heavy brackets [ ] appears in the original patent but forms no part of this reissue specification; matter printed in italics indicates the additions made by reissue.

*ABSTRACT OF THE DISCLOSURE*

*A method of producing liquefiable hydrocarbons from an underground reservoir formation by forcing a liquid that reacts exothermically with hydrocarbons into the formation and into contact with hydrocarbons in selected portions of the reservoir formation and maintaining the liquid reactant within the reservoir formation until it reacts with the contacted hydrocarbons and selectively heats the portions of the reservoir formation that are adjacent to the hydrocarbons that are contacted.*

The invention relates to a method for recovering hydrocarbon material from a normally substantially impermeable underground oil reservoir that becomes permeable when the oil therein has been heated, such, for example, as tar sands. The invention pertains more particularly to a method for the primary and/or secondary recovery of oil which is tightly bound to the formation, as in the case of tar sands, or is of a viscous and relatively nonflowable nature under normal formation conditions. This invention constitutes a desirable method for supplying heat to an underground oil-bearing formation for the purpose of increasing the oil recovery therefrom.

The primary production of petroleum hydrocarbon from oil-bearing formations is usually effected by drilling through or into the oil-bearing sand and providing access to the formation through the borehole so as to permit oil to flow into the borehole from which it may be recovered by conventional methods and apparatus. If the formation contains oil of low medium viscosity at reservoir conditions, the well may be produced either by flowing or pumping in a manner well known to the art. If, on the other hand, the formation contains a highly viscous oil at reservoir conditions, it may be necessary to heat the formation in the vicinity of the borehole to reduce the viscosity of the oil so that the oil may flow into the borehole although a substantial amount of oil still remains in the producing formation underground. The residual oil left in the formation undergrounnd is very difficult to produce and considerable research has been carried out on secondary recovery methods to recover this residual oil. Various methods have been devised such as heating, underground combustion, flooding with water or a miscible fluid, etc. These methods involve injection of water, gas, air, fuel, solvents, etc. or a combination of these into the formation through one or more input wells, while the hydrocarbon or components thereof are withdrawn through one or more output or producing wells. The flooding of underground formations for primary or secondary recovery of hydrocarbon materials, such as oil, presents many problems, especially in tight or relatively non-permeable formations. In the water flooding of an oil-bearing underground formation, it is necessary to employ flood water free of clays, colloidal material, undissolved salts, etc., which would tend to plug the face of the oil formation and perhaps within the oil formation itself when the water is injected thereinto. In addition, many producing formations being flooded contain a certain amount of swelling clay in the form of a bentonite or montmorillonite clay, which upon swelling, reduces the permeability of the formation. The use of solvents as a flood or the use of chemicals added to the water for flooding a formation is often prohibitive in cost. Additionally, many of the oils left in the formation are very viscous and it is essential that they be heated in order to cause them to flow to a producing well. While underground combustion is successful in many fields, it has the drawback that it destroys or uses as fuel some of the hydrocarbons in the formation. Further, while formations may be heated by means of injecting a hot fluid such as steam, hot water, hot solvents, etc. in the formation, the heating of the flooding material at the surface is expensive and of course there is some heat loss in transmitting the heated material from the surface down possibly thousands of feet of pipe to the desired location in the well.

It is therefore a primary object of the present invention to provide a method for heating an underground hydrocarbon-bearing formation in a relatively inexepnsive manner so as to increase the yield of oil from the formation.

Another object of the present invention is to provide a method of heating an underground hydrocarbon-bearing formation by means of injecting a fluid thereinto which does not have to be heated at the surface before pumping it down the well.

A further object of the present invention is to provide a method for the primary or secondary recovery of oil from a formation by injecting a heat-creating chemical i.e., one that reacts exothermically in the formation with the hydrocarbon contained therein.

Still another object of the present invention is to provide a method whereby permeable flow channels may be formed extending outwardly from a well, or extending between at least two wells, in a manner such that ordinary or presently-known flood methods can be carried out between wells penetrating the formation after the permeable channels have been formed.

Another object of the present invention is to provide a method for heating an underground oil-bearing formation without the necessity of employing heating equipment at the well site.

A still further object of the present invention is to provide a method of increasing the permeability of the formation walls on either side of a fracture between closely spaced wells so that a permeable flow channel between the wells remains after the fracture has closed.

It is also another object of the present invention to provide a method of heating underground oil-bearing formations by injecting a liquid reactant therein which obviates the hazard encountered in injecting a gaseous reactant at a pressure sufficient to form fractures in the formation.

These and other objects of this invention will be understood from the following description.

The method according to the present invention contemplates producing liquid or liquifiable hydrocarbons from a hydrocarbon-bearing subsurface formation which is penetrated by one well, by introducing into the well a quantity of solid-free liquid reactant which reacts exothermically with hydrocarbons confining the liquid reactant in the well opposite a selected interval of the hydrocarbon-containing formation, applying a pressure to the liquid reactant sufficient to force it into the hydrocarbon-containing formation, maintaining the liquid reactant in situ for a time suffiicent for the liquid reactant to react exothermically with a portion of the hydrocarbon of the formation and heat the hydrocarbon-containing formation adjacent the well and/or adjacent fractures formed in the formation, and subsequently producing oil from the heated formation. In some cases, the liquid reactant is forced into the formation at a pressure at which the formation is fractured while being supplied into the fracture in a quantity sufficient so that the liquid reactant is forced into the walls forming the fracture.

This method of generating heat in an oil-bearing formation by means of a liquid reactant is especially suitable for selectively heating a limited region or selected location within an oil reservoir formation. When using a liquid reactant as a heat-creating medium, the need for heating equipment at the well site is avoided. A liquid reactant is superior to a gaseous reactant as the use of a gaseous reactant would necessitate the use of expensive high pressure compressing equipment at the wellhead.

The liquid reactant is allowed to remain in the formation for a time sufficient to heat the desired portion of the formation. The heating of the reservoir formation need only be sufficient to move the petroleum within the selected region of the formation or to put the petroleum in a condition that it will move readily from the formation when the well is produced. The degree to which the oil mobilization is attained can readily be determined by applying a pressure gradient across the selected region, for example, between two wells and measuring the amount of petroleum that is displaced. In the event that a first injection of reaction fails to provide sufficient heat, successive injections of liquid reactant may be used.

In using the method of the present invention to effect a thermal soaking around a well and a backflow of oil into the well, enough liquid reactant to permeate a significant portion of the reservoir formation is injected thereinto at whatever pressure is required to force it into the reservoir formation. Since the reactant is liquid, the formation of fractures does not create either a hazard or a significant disadvantage as would the case be if the reactuant were a gas. Preferably, the injection well is opened at a point opposite the oil-containing reservoir formation to communicate with a vertically extensive interval of the reservoir formation to encourage uniform penetration and/or vertical or horizontal fracturing. After injecting a selected volume of liquid reactant, for example 200 barrels, into a formation having a thickness of 20 feet, the well is shut in at the injection pressure. After such a soaking, the pressure within the well is reduced so as to initiate backflow of oil into the well. The backflow results from the pressure drop between the injection pressure, or the formation fluid pressure, and the pressure within the well. The wells can be swabbed or pumped to reduce the pressure in the well to substantially atmospheric pressure, if desired.

This method of thermal soaking of a formation with a liquid reactant can take place in a single well which would be used both as an injection and a production well. Fracturing of the formation may or may not take place during the thermal soaking process. Thermal soaking of a well permits producing a high viscosity oil from a reservoir that has a significant but low permeability. The liquid reactant is preferably a liquid oxidant which is injected into the reservoir and maintained there for a time sufficient to oxidize reservoir oil and heat the reservoir prior to producing a reservoir. In most reservoirs significant advantages can be obtained by injecting a fluid containing a higher concentration of oxidant than can be feasibly obtained from a free-oxygen-containing gas. Since it is undesirable to inject a gas into a reservoir at a pressure exceeding the overburden pressure, a liquid reactant or a liquid phase oxidant in accordance with the present invention is advantageous.

The method of the present invention can also be employed in oil fields containing at least two wells which penetrate an oil-bearing formation of significant but low permeability wherein the liquid oxidant would be injected through one well, into the formation and thence to the production well. An example of this modification of the present process is given. A well completed into a tar sand of significant but low permeability is freed of organic material by circulating a slug of hydrocarbon solvent followed by a slug of aqueous liquid containing a detergent. A slug of fresh water is then injected into the formation while fluids are withdrawn from an adjacent production well that is completed in the same reservoir at a distance of, for example, 50 feet. In a typical situation about 400 barrels of 5% aqueous hydrogen peroxide would be injected into the well and into the oil-bearing tar sand. The hydrogen peroxide injection might require about 1 to 2 weeks and the peroxide is left in the formation about 1 to 2 months. Fluids are then produced from the heated reservoir by means of secondary recovery methods suitable for an oil of about medium viscosity.

In the preferred modification of the present invention, a pressure is applied to the liquid reactant in the well which is sufficient to form fractures in the formation extending outwardly from the well. Liquid reactant is then forced into the fractures and into the formation forming the walls of the fractures to heat a radially extensive portion of the formation around the well. When at least two wells are involved a pressure may be subsequently applied to the liquid reactant sufficient to extend the fractures to a second well with the pressure being maintained at a value sufficient to maintain the fractures open in the absence of propping agents, whereby the hydrocarbons in the formation forming the walls of the fractures are heated.

In the event that the fractures extending from the injection well did not extend all the way to the production well, the fracture into which the reactive liquid was injected can be subsequently swept free of the spent reactant and the oil of reduced viscosity by liquid displacement of these fluids into the formation or by allowing them to drain back to the injection well. Subsequently, the fracture could be retreated with a new quantity of liquid reactant to remove more of the oil from the formation, which step could be repeated, as needed. In the normally-porous reservoir formations that are plugged with viscous oils, a removal of the oil contained in the walls of the fracture creates a permeable path through the reservoir formation. As soon as such a permeable path or layer has obtained a thickness of a few inches, the reservoir formation can be readily heated and produced by conventional thermal drive procedures, such as steam or hot water injection, which, because of the permeable path, are not dependent upon propped fractures or injection pressures that exceed the overburden pressure of the depth of the reservoir. Thus, once the oil has been removed from the wall surrounding a fracture to form a permeable flow path along the fracture, the pressure at which the liquid reactant was injected can be reduced below that needed to hold the fracture open.

A modification of the heating and fracturing process described hereinabove would permit a fracture extending from the injection well, after being freed of organic material, to have water injected into it at a pressure and a volume sufficient to extend the fracture to the production well. The water would then be displaced from the fracture by injecting enough hydrogen peroxide through the injection well and fracture to cause a layer of hydrogen peroxide to be produced at the production well. The rate of hydrogen peroxide injection is maintained until the front of the concentrated solution of hydrogen peroxide reaches the production well, at which time injection is stopped and the peroxide reactant is allowed to remain in the formation for a one or two month period in order to heat the entire formation.

A liquid phase reactant or oxidant may be employed which reacts exothermically with the oil of the formation. Thus for example hydrogen peroxide, nitrous oxide, sulfur trioxide, etc., and liquids containing these materials are suitable. If sulfur trioxide is to be used it is preferably in the form of oleum, i.e. concentrated sulfuric acid having an excess of sulfur trioxide present. Clear solutions rather than suspensions must be employed as suspensions of material are undesirable as the solid material in the suspension filters out on the surface of the borehole wall and limits or prevents further injection of fluid into the formation. Nitrogen oxides which are used in accordance with the present invention are used in a reservoir in which the overburden pressure is a value at which the nitrogen oxide being used is liquid, or at which the nitrogen oxide forms an aqueous solution. Nitrogen oxide may be used in the form of fuming nitric acid. Thus the reactants that are contemplated for use in the present process comprise single phase liquid systems which are readily injected into the earth formations.

In respect to using oleum in fractures in the formation in accordance with the present method, the fracture would be immediately heated by the heat of hydration and/or neutralization released as the oleum displaces an aqueous fracturing fluid and/or any water in the pores of the formation. When a layer of oleum extends from an injection well to the vicinity of a production well, the injection of the oleum is preferably stopped to prevent its flow out of the formation and the oleum is allowed to complete its reaction with the hydrocarbons in the wall of the fractures. After allowing this reaction with its concurrent heating to occur, the spent oleum may be displaced or contacted with caustic, thus causing further heating within the formation due to neutralization of the unreacted sulfuric acid. This action would also enhance the emulsification of the oil in the injected liquids due to the surfactant properties of the salts of the sulfonated aromatic compounds formed by the reaction of some of the sulfur trioxide with a portion of the hydrocarbons in the formation. This method of heating is particularly advantageous in that the heat is generated in situ all along the walls of the fractures that may penetrate deeply into the formation. It provides a means for relatively quickly heating a substantial volume of an oil-bearing reservoir.

As indicated hereinabove, a liquid phase reactive fluid comprises a particularly advantageous means of chemically heating portions of an underground reservoir formation because it is dangerous to inject a gas at pressures exceeding the overburden pressure of the reservoir formation. The use of liquid is advantageous because the pressure applied to them is immediately reduced (by the effects within the formation) whenever fracturing occurs. In contrast, a gas, which is a relatively extensively compressible fluid, would immediately expand into the greater volume made available by the fracture and would continue to exert a relatively high pressure in a manner liable to cause a blowout through the surface. Blowouts, especially around a well casing, having been experienced when using a gas as an injection fluid in a formation. As compared to gases, liquid reactants have the additional advantages of requiring materially less equipment and energy to provide a given high injection pressure and also have the capability of containing a much greater mass of reactants per unit volume.

The method of the present invention is not concerned with heating a formation to ignition temperature of the oil to carry out secondary recovery of oil by underground combustion methods. This high degree of heating is not pertinent to the present process. All that is needed is a temperature rise sufficient to move a localized portion of the oil adjacent the well or the fractures extending therefrom. The amount of heating obtained by the present method does not cause cracking or distillation of oil in the reservoir. It need only render the oil susceptible to fluid displacement and/or entrainment by the reactant liquid and/or other fluids that are subsequently pumped through or displaced within the selected portion of the reservoir formations.

We claim as our invention:

1. A method of producing liquid or liquifiable hydrocarbons from a hydrocarbon-containing subsurface formation, said formation being penetrated by at least one well, said method comprising:

introducing into a well a quantity of a solids-free liquid reactant which reacts exothermically with hydrocarbons, confining said liquid reactant in said well opposite a selected interval of said hydrocarbon-containing formation, applying a pressure to said liquid reactant sufficient to form fractures in said hydrocarbon-containing formation, subsequently maintaining said liquid reactant in said fractures for a time sufficient for the liquid reactant to react exothermically with a portion of said hydrocarbon of said formation and heat the hydrocarbon-containing formation adjacent the well, and subsequently producing hydrocarbons from the heated hydrocarbon-containing formation adjacent the fractures to form permeable flow channels in said formation along said fractures.

2. The method of claim 1 wherein the hydrocarbons are produced back into the well by discontinuing the application of pressure to the liquid reactant and opening the well in a manner permitting flow of hydrocarbon into the well.

3. The method of claim 1 carried out in one well positioned in the vicinity of a second or production well wherein the hydrocarbons are produced into said second well by maintaining a pressure on the liquid reactant forced into said formation.

4. The method of claim 1 including the step of applying a pressure to said liquid reactant sufficient to extend said fractures to a second well, and maintaining said pressure at a value sufficient to maintain said fractures open in the absence of propping agents, whereby the hydrocarbons in the formation forming the walls of the fractures are heated.

5. The method of claim 4 including the step of producing heated hydrocarbons from the fractures.

6. The method of claim 5 including the step of increasing the permeability of the hydrocarbon-containing formation adjacent the fractures throughout the length thereof by injecting additional liquid reactant until a chemically-heated permeable flow channel is formed through said formation adjacent the fractures, and subsequently reducing the injection pressure below that necessary to maintain the fractures open while being sufficient to fore fluid through the permeable flow channels formed in the formation.

7. The method of claim 6 including the step of subsequently producing the hydrocarbon-containing formation by injecting a non-reactant fluid in one well under pressure so that it drives hydrocarbons to said second well.

*8. A method of producing liquid or liquefiable hydrocarbons from a hydrocarbon-containing subsurface formation, said formation being penetrated by at least one well, said method comprising:*

*hydraulically fracturing said hydrocarbon-containing formation,*

*introducing into a well a quantity of a solids-free liquid reactant which reacts exothermically with hydrocarbons,*

*confining said liquid reactant in said well opposite a selected interval of the fractured hydrocarbon-containing formation,*

*applying a pressure to said liquid reactant sufficient to force it into the fractures and the walls of the fractures in said hydrocarbon containing formation,*

*subsequently maintaining said liquid reactant in said fractures for a time sufficient for the liquid reactant*

*to react exothermically with a portion of said hydrocarbon of said formation and heat the hydrocarbon-containing formation adjacent the well, and*

*subsequently producing hydrocarbons from the heated hydrocarbon-containing formation adjacent the fractures to form permeable flow channels in said formation along said fractures.*

References Cited

The following references, cited by the Examiner, are of record in the patented file of this patent or the original patent.

UNITED STATES PATENTS

| | | | |
|---|---|---|---|
| 2,635,996 | 4/1953 | Rhorback et al. | 166—38 X |
| 2,746,551 | 5/1956 | Mounce | 166—42 X |

| | | | |
|---|---|---|---|
| 2,751,348 | 6/1956 | Brainerd | 166—42 X |
| 2,863,510 | 12/1958 | Tadema et al. | 166—38 |
| 2,876,838 | 3/1959 | Williams | 166—11 |
| 2,901,043 | 8/1959 | Campion et al. | 166—11 X |
| 2,969,226 | 1/1961 | Huntington | 166—11 X |
| 3,004,594 | 10/1961 | Crawford | 166—11 |
| 3,104,706 | 9/1963 | Eilers et al. | 166—42 |
| 3,129,758 | 4/1964 | Closmann | 166—42 |
| 3,167,119 | 1/1965 | Meadors | 166—9 |

OTHER REFERENCES

Uren, Petroleum Production Engineering, Oil Field Exploitation, 2nd edition, McGraw-Hill Book Co., Inc., New York (1939), pp. 376–379 relied on.

STEPHEN J. NOVOSAD, *Primary Examiner.*